Sept. 6, 1960     F. C. RUSHING     2,951,730
CUSHIONED BEARING

Filed Sept. 20, 1944     4 Sheets-Sheet 1

INVENTOR
Frank C. Rushing.
BY
ATTORNEY

Sept. 6, 1960

F. C. RUSHING 2,951,730

CUSHIONED BEARING

Filed Sept. 20, 1944

INVENTOR

Frank C. Rushing.
BY
Robert G. Lavender
ATTORNEY

Sept. 6, 1960
F. C. RUSHING
2,951,730
CUSHIONED BEARING
Filed Sept. 20, 1944
4 Sheets-Sheet 3
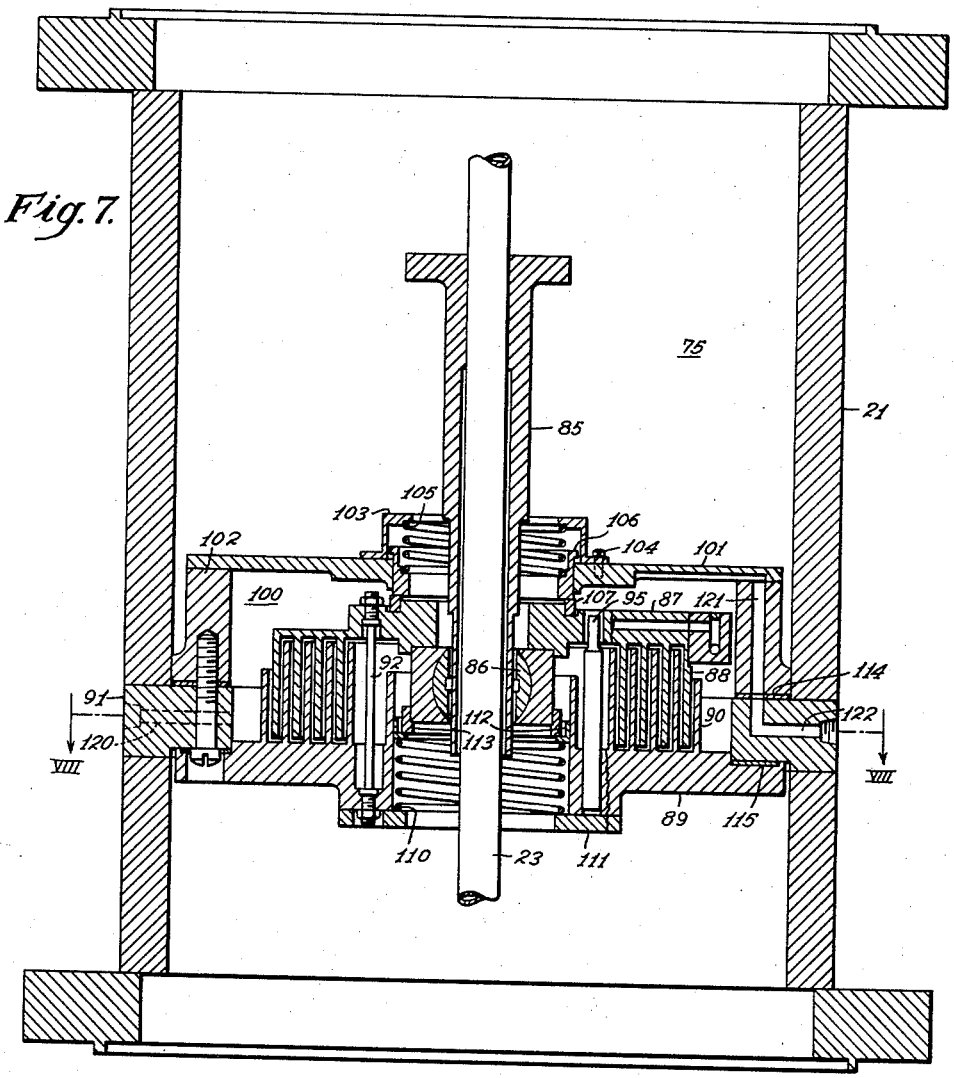
Fig. 7.
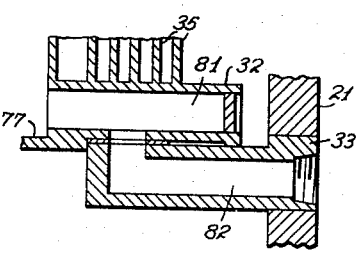
Fig. 4.
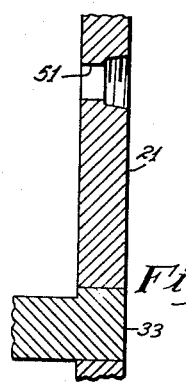
Fig. 5.
Fig. 6.
INVENTOR
Frank C. Rushing.
BY
ATTORNEY Sept. 6, 1960  F. C. RUSHING  2,951,730
CUSHIONED BEARING Filed Sept. 20, 1944  4 Sheets-Sheet 4

INVENTOR
*Frank C. Rushing.*
BY
*Robert A. Lavender*
ATTORNEY

United States Patent Office 2,951,730
Patented Sept. 6, 1960

2,951,730

CUSHIONED BEARING

Frank C. Rushing, Pittsburgh, Pa., assignor, by mesne assignments, to the United States of America as represented by the United States Atomic Energy Commission Filed Sept. 20, 1944, Ser. No. 554,979

8 Claims. (Cl. 308—146)

The present invention relates to centrifuges and like rotating devices, and more particularly to such devices having novel and improved means for damping vibration forces occurring during the operation thereof.

In centrifuges and like devices in which relatively high speeds of rotation are employed, certain speeds of operation are encountered called critical speeds. At such speeds the shaft of the device is distorted or flexed out of the axis of rotation and, while rotating in such distorted positions, causes severe vibrating forces to be transmitted to the bearings and supporting structures in which the shaft operates, wtih consequent danger in operation, possibility of damage to the structure, and lessening of efficient functioning of the assembly. In addition, the rotor or bowl in such centrifuges is flexible and is likewise subject to severe vibrating forces particularly at critical speeds of operation. In centrifuge constructions in which the mass of the rotor or bowl is much greater than that of the shaft this flexibility of the rotor or bowl introduces the greater problem of vibration because the energy in its vibration is much greater than that in the shaft vibration. In centrifuges a critical speed occurs where the speed of rotation of the centrifuge is such that the number of revolutions in a given unit of time is equal to the number of vibrations in the same time unit that correspond to one of the natural modes of vibration of the rotating member and its supporting structure, and the speeds of rotation at which these critical speeds occur depend for the most part upon the stiffness of the shaft, and the inertia of the stationary and rotating parts of the device. A more complete consideration and explanation of the forces attendant upon the high speed rotation of centrifuges and similar devices may be found in United States Patent 2,147,420 issued February 14, 1939, to J. G. Baker et al.

It is an object of the present invention to provide a centrifuge or like rotating device having novel means operable to effectively dampen vibration.

Another object of the invention is to provide a centrifuge or the like having vibration damping means that are effective to dampen vibrations occurring at the several critical speeds encountered in the operation of a high speed centrifuge and thus render the device safe and efficient in operation and prevent excessive wear and breakage in its parts.

Still another object is the provision of an improved damping device of sturdier but more flexible construction than dampers heretofore used.

The invention further provides a damping mechanism for a high speed centrifuge to effectively dampen vibrations at all critical speeds encountered in operation of the centrifuge and which affords additional damping action at high critical speeds where the most dangerous and damaging vibrations are encountered.

A further object is to provide improved means for associating a damping mechanism with the shaft of a centrifuge and including self-centering bearing means such that protection is afforded both the centrifuge shaft and the damping mechanism when vibratory dislocations occur.

Another object is the provision of sealing means in association with the damping mechanism of a centrifuge so that pressure differences may be effectively retained between the space about the damping mechanism and the space about the centrifuge rotor.

These and other objects of the invention and the various details of the construction and operation thereof are hereinafter fully set forth and described with reference to the accompanying drawings, in which:

Fig. 4 is a vertical cross sectional view taken along line IV—IV of Fig. 2.

Fig. 5 is a vertical cross sectional view taken along line V—V of Fig. 2.

Fig. 6 is a vertical cross sectional view taken along line VI—VI of Fig. 2.

Fig. 7 is a vertical cross sectional view showing in detail the damping mechanism for the lower shaft of the centrifuge.

Figure 1:
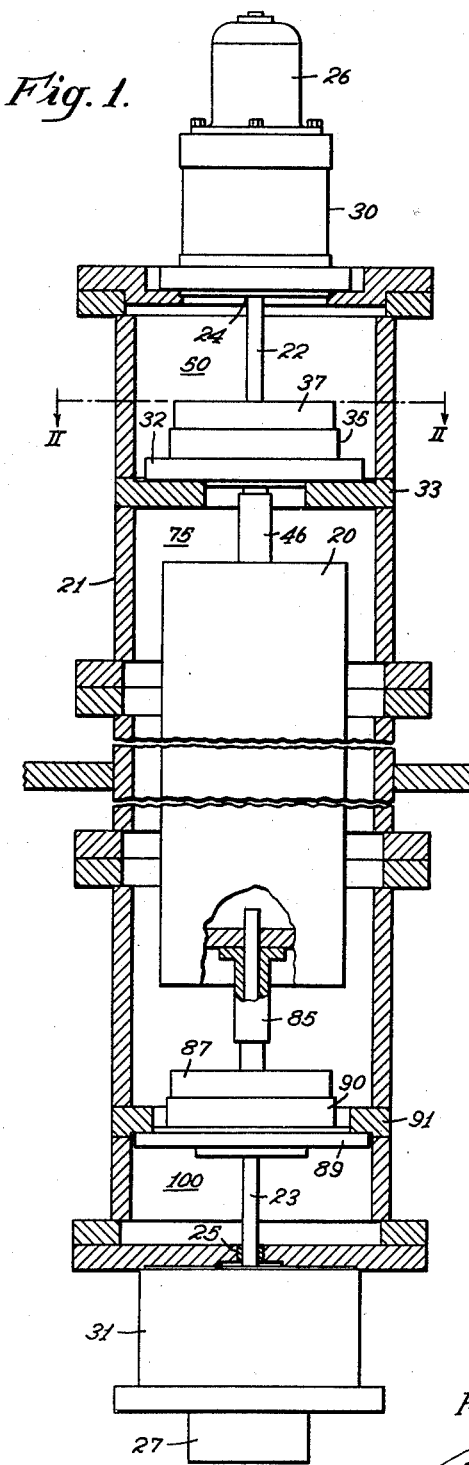
Fig. 1 is a vertical cross sectional view of a centrifuge with vibration damping means showing a typical and illustrative embodiment of the present invention.

In accordance with the present invention there is provided a high speed centrifuge that may be used, for example, in the separation of isotopes of elements in their gaseous form and is adapted to operate at speeds as high as 470 revolutions per second. The centrifuge may comprise a vertically disposed bowl or rotor within which the separation by means of centrifugal action takes place, and the rotor is provided with upper and lower shafts through which gas may flow to and from the rotor and by which the rotor is mounted for free rotational movement. Driving means, as for instance an electric motor, are provided on the upper rotor shaft for driving the centrifuge and the rotor is enclosed within a substantial housing that acts as a protection in case of bursting of the rotor as well as an enclosure which may be evacuated to lower frictional forces acting on the rotor. Damping means are provided for the upper and lower shafts of the rotor in order to dampen vibration of the rotor and shafts during operation, such vibration being particularly pronounced during critical speeds of operation. Such damping means for each shaft comprise a tapered, elongated tubular member surrounding the shaft and secured at one end to the shaft adjacent the rotor end and spaced apart from the shaft throughout the rest of its length. Externally of the tubular member adjacent its other end there is provided a self-centering bearing in which the member is adapted to rotate, and the bearing is carried by a damping member having a plurality of concentrically arranged sleeves which are thus arranged to follow dislocations of the shaft out of its axis of rotation. The sleeves of the damping member are arranged in alternate overlapping relationship with other damper sleeve members that are secured to a stationary part of the centrifuge, and oil or other suitably viscous fluid is provided between the sleeves of the damper members. The damper member which follows the shaft vibration is supported upon the stationary damper member by means of a plurality of flexible struts extending between the members providing support for the movable damper member and the bearing supported thereby but allowing relative movement of the overlapping sleeves. Sealing means are provided between the space about the damper, which it is desired to have at about atmospheric pressure, and the space about the rotor, that may, for example, be evacuated to provide therein a lower pressure. Sealing means are also provided about the self-centering bearing in the lower damper assembly to prevent loss of damper fluid from the damper sleeve space.

It will be understood that the foregoing general description and the following detailed description as well are illustrative and explanatory of the invention but are not restrictive thereof.

Referring now in detail to the illustrative embodiment of the invention as shown by way of example in the accompanying drawings, the centrifuge comprises a rotor or bowl 20 enclosed within a substantial housing 21 that is stationarily supported in any suitable manner. The rotor 20 is mounted for rotation by means of upper and lower hollow shafts 22 and 23, respectively, journalled in bearings 24 and 25 in the upper and lower ends of housing 21, and is driven by an electric motor 26 at the upper end of shaft 22. A suitable thrust bearing 27 is provided at the bottom of the lower shaft 23 and gas inlet and outlet means may be provided at positions 30 and 31 of the centrifuge in accordance with any suitable known practice and construction so that gas to be separated may be introduced into and withdrawn from the hollow shafts 22 and 23 and pass through the rotor 20 for separation.

Figure 2:
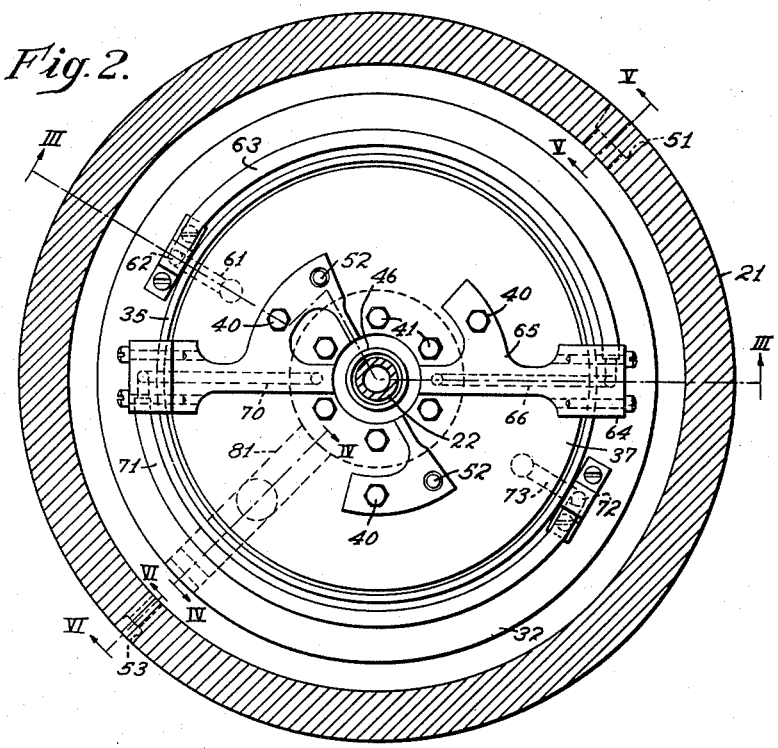
Fig. 2 is a horizontal cross sectional view of the centrifuge shown in Fig. 1 taken along line II—II of Fig. 1.
Figure 3:
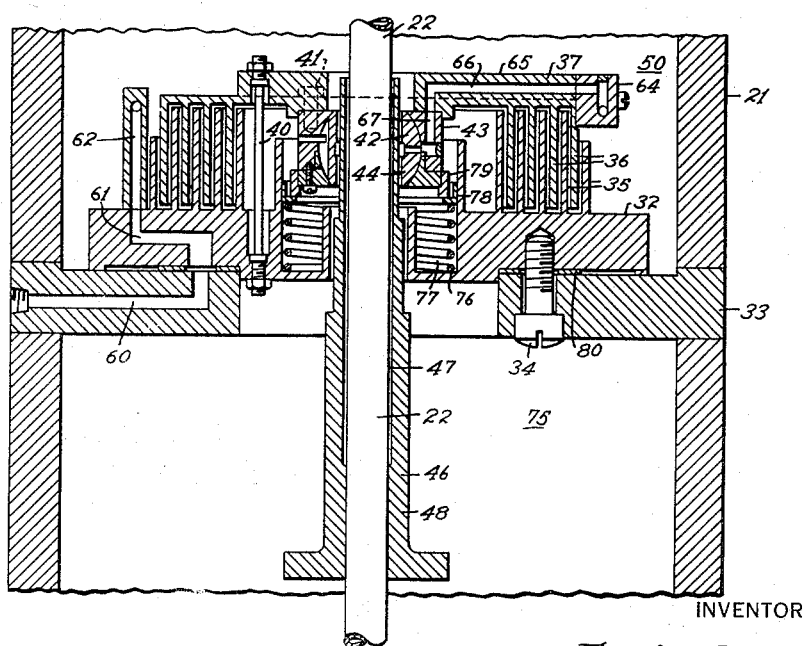
Fig. 3 is a vertical cross sectional view taken along line III—III of Fig. 2 and showing in detail the damping mechanism for the upper shaft of the centrifuge rotor.

The vibration damping means for the upper shaft 22 of the rotor 20 is shown in detail in Figs. 2 and 3. As there shown, a stationary damping member is provided having an annular base 32 fixedly supported on an inwardly extending annular shoulder 33 of the centrifuge housing, and tap bolts 34 hold the members in assembled relation. A plurality of concentric, spaced apart sleeves 35 extend upwardly from the base 32 and other concentric spaced apart sleeves 36 extending downwardly from a base member 37 are positioned in alternate, overlapping, spaced-apart relationship with respect to the sleeves 35. The upper sleeve base member 37 is designed to follow the vibrations of shaft 22, and for that purpose is supported on the lower sleeve base 32 by means of a plurality of flexible struts 40. Secured by bolts 41 to the base member 37 is a self centering bearing 42 in which is journalled the upper end of an elongated tubular member 46. The bearing 42 comprises a base or holder 43 and bearing member 44 and adjacent faces of these members are finished in cooperating concave-convex form. Tube 46 is positioned around the shaft 22, and has sufficient internal diameter so that an annular space 47 is provided between the tube 46 and shaft 22 throughout a major portion of the length of the former, the two being secured together for correlative rotation at the lower end 48 of the tube. Tube 46 is of diminishing thickness toward its upper end in order to provide flexibility and minimum mass in its construction.

In the construction described, it will be apparent that the sleeve base 37 is arranged to follow the vibrations of the upper end of rotor 20 through the interconnection of tube 46, and oil or other suitably viscous fluid may be introduced into the space designated by numeral 50 through aperture 51 (Fig. 5) in the wall of housing 21 to cover the concentric annular sleeves 35 and 36. When vibration occurs, the movable sleeves 36 agitate the oil and thus dissipate energy transmitted to them, to effectively damp out vibration.

A pair of pins 52 are provided firmly embedded in the lower sleeve base member 32 and extending into apertures in the upper sleeve base 37, and serve as safety devices to prevent relative rotation between the members 32 and 37 in case of failure of bearing 42 or other accident tending to rotate member 37. Oil may be drained from space 50 about the damper sleeves through another aperture 53 (Fig. 6) through the wall of housing 21.

Means for lubricating and cooling the self-centering damper bearing 42 are provided, and as embodied in the illustrated device comprise an oil passage 60 extending radially into the annular damper support 33 and communicating with a passage 61 in the sleeve base member 32. The lubricant then passes upward through an upwardly extending conduit 62, thence through a flexible tube 63 (Fig. 2) into a head piece 64 secured to integral enlarged portion 65 of the sleeve base member 37, through which extends a passage 66. From passage 66 lubricant passes downwardly through passage 67 in bearing 42, and then radially through the bearing. Lubricant is withdrawn from the bearing through an identical arrangement of parts through passages numbered 70, 71, 72 and 73, as shown in Fig. 2.

Means are provided for sealing off the rotor chamber 75 from the chamber 50 within which the damper assembly is positioned, both to prevent leakage of damper oil into the rotor chamber and because it is desirable to have the pressure in chamber 50 at about atmospheric while it is usually desired to at least partially evacuate space 75 about the rotor 20. Such a sealing means may comprise a coiled spring 76 seated in an annular cup or recess 77 formed in sleeve base member 32 adjacent its inner periphery, the spring 76 serving to bias a shouldered ring 78 engaging a sleeve member 79 secured to bearing 42. There is thus provided a sliding seal between bearing 42 and base member 32, and a suitable gasket 80 is positioned between base member 32 and its annular support 33 to prevent leakage between the members. Oil which may work between the members 78 and 79 in the lubrication of the sliding seal is caught in recess 77, and may be drained out through passages 81 and 82 (Fig. 4) provided in members 32 and 33 respectively.

The damping means provided for the lower shaft 23 of the rotor is generally similar in construction and operation to the damper for the upper shaft, and as shown (Fig. 7), comprise the tubular member 85 secured to the end of the rotor 20 and journalled in a self-centering bearing 86 which is carried by the movable damper sleeve base member 87 having depending concentric sleeves 88. The lower sleeve base member 89 carries concentric sleeves 90 and is secured to an annular support 91 extending inwardly from the rotor housing 21. Flexible struts 92 support the upper sleeve base member 87 and stop pins 95 are provided between the sleeve base plates for purposes already set forth in connection with the upper damper.

The sealing means for maintaining a pressure difference between the space 75 about the rotor and space 100 about the lower damper assembly may comprise the annular cover plate 101 secured, as by welding, to the top of a cylindrical member 102 that surrounds the damper sleeves and is secured to support 91. The annular cap member 103 surrounding shaft 23 is secured to plate 101 by means of screws 104, and serves to retain a spring 105 compressed against shouldered ring 106 which in turn bears against bearing ring 107 positioned in a groove in the upper face of sleeve base member 87.

Means are provided for preventing the escape of damper fluid that surrounds movably mounted bearing 86 and for allowing a higher pressure in the damper chamber than in the space around the rotor, and as embodied in the illustrated device said means may comprise the spring 110 supported upon an annulus 111 secured to the bottom of sleeve base plate 89 and biasing a shouldered ring 112 against a bearing ring 113 which is shouldered to fit the lower end of bearing 86. Suitable gaskets 114 and 115 are provided on the upper and lower faces of support 91 between it and the supported members 102 and 89.

Figure 8:
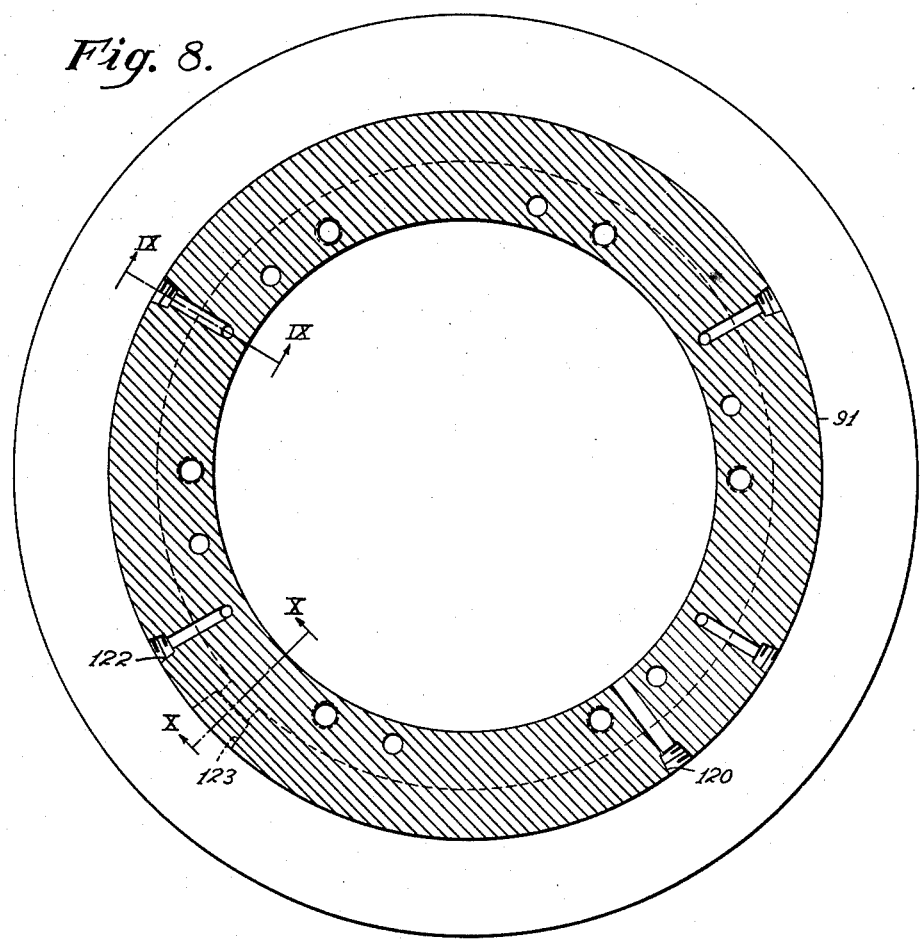
Fig. 8 is a horizontal cross sectional view taken along line VIII—VIII of Fig. 7.
Figure 9:
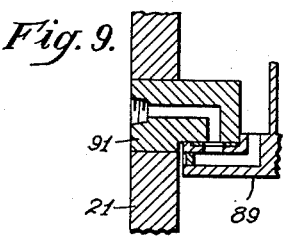
Fig. 9 is a vertical cross sectional view taken along line IX—IX of Fig. 8.
Figure 10:
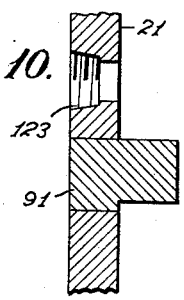
Fig. 10 is a vertical cross sectional view taken along line X—X of Fig. 8.

The means for circulating oil to and through bearing 86 for cooling and lubrication are substantially identical to the means already described in connection with the upper damper assembly and will be apparent from Figs. 7, 8 and 9 of the drawings.

Damper fluid may be supplied to the lower damper assembly through a passage 120 in the supporting member 91, and a plurality of passages 121 and 122 are provided in supporting member 91 and cylindrical member 102, respectively, communicating with the top of the damper chamber for withdrawing excessive or overflow damper fluid. A passage 123 is provided through the wall of housing 21 just above the support member 91 in order to drain out fluid which may have escaped into the rotor chamber 75 from the damper and bearing assemblies.

In the operation of the centrifuge shown and described and with the device rotating at high speeds, as, for instance, about 470 revolutions per second, four important critical speeds are encountered in accelerating the rotor to such a speed and decelerating it therefrom. At about 1000 revolutions per minute a natural frequency of the rotor and shafts causes translation of the axis of the rotor. At about 2000 revolutions per minute the axis of the rotor vibrates angularly and there is a nodal point near the center of the rotor. At about 6000 revolutions per minute a natural frequency brings about simple bending of the rotor and there are two vibration nodes associated with the vibration. At about 15,000 to 18,000 revolutions per minute there is a three noded vibration of the rotor. Vibration occurring at these critical speeds is effectively damped by agitation of the fluid about the associated movable and stationary damper sleeves. At the highest critical speed, which produces the most pronounced and destructive vibration of any encountered, the masses of the movable damper members on the ends of tubular members 46 and 85 are near resonance, and this condition accentuates the damping effect at this critical speed.

The invention in its broader aspects is not limited to the specific mechanisms shown and described, but departures may be made therefrom within the scope of the accompanying claims without departing from the principles of the invention and without sacrificing its chief advantages.

I claim:

1. Damping means for a vibratile shaft comprising, in combination, spaced apart movable and stationary sleeve members surrounding said shaft, means for maintaining a body of fluid between said members, a flexible tubular member surrounding said shaft secured adjacent one end to said shaft and spaced apart from said shaft throughout the rest of its length, and bearing means adjacent the other end of said member in which the member is journalled, said bearing means being connected to said movable sleeve member.

2. Damping means for a vibratile shaft comprising, in combination, spaced apart movable and stationary sleeve members surrounding said shaft, means for maintaining a body of fluid between said members, a flexible tubular member surrounding said shaft secured adjacent one end to said shaft and spaced apart from said shaft throughout the rest of its length, and self-centering bearing means adjacent the other end of said member in which the member is journalled, said bearing means being connected to said movable sleeve member.

3. Damping means for a vibratile shaft comprising, in combination, spaced apart movable and stationary sleeve members surrounding said shaft, means for maintaining a body of fluid between said members, a flexible tubular member surrounding said shaft secured adjacent one end to said shaft and spaced apart from said shaft throughout the rest of its length, and self-centering bearing means adjacent the other end of said member, said bearing means comprising a bearing block member secured to said movable sleeve member and a bearing member in which said tubular member is journalled, said block and bearing members having cooperating concave-convex surfaces.

4. Damping means or a vibratile shaft comprising, in combination, spaced apart movable and stationary sleeve members surrounding said shaft, means for maintaining a body of fluid between said members, a plurality of flexible strut members interconnecting said members for flexibly supporting said movable sleeve member on said stationary sleeve member, said movable member being connected to said shaft for radial movement therewith.

5. In a centrifuge having a rotor enclosed within a housing mounted for free rotation by means of a shaft passing through said housing, the combination of spaced apart movable and stationary sleeve members surrounding said shaft, means for maintaining a body of fluid between said members, a flexible tubular member surrounding said shaft secured adjacent one end to said shaft and spaced apart from said shaft throughout the rest of its length, self-centering bearing means secured to said movable sleeve member in which said tubular member is journalled adjacent its other end, and sealing means between said bearing means and said housing.

6. Damping means for a vibratile shaft comprising, in combination, a flexible elongated tubular member surrounding said shaft said member being secured adjacent one end to said shaft and being spaced apart from said shaft and of diminishing wall thickness throughout the rest of its length, and means adjacent the other end of said member for damping vibration of said shaft transmitted through said member.

7. Damping means for a rotatable, vibratile shaft comprising in combination, spaced apart movable and stationary sleeve members arranged concentrically of said shaft, means for maintaining a body of fluid between said members, means connecting said movable member for radial movement with said shaft, said connecting means including a radially flexible member fixed to and rotating with said shaft, said flexible member being fixed to said shaft solely at a point axially displaced along said shaft from said sleeve members.

8. Damping means for a rotatable, vibratile shaft comprising in combination, spaced apart movable and stationary sleeve members arranged concentrically of said shaft, means for maintaining a body of fluid between said members, means connecting said movable member for radial movement with said shaft, said connecting means including a radially flexible member fixed adjacent an end thereof to said shaft at a point axially displaced along said shaft from said sleeve member, and spaced apart from said shaft and of diminishing wall thickness throughout the rest of its length.

References Cited in the file of this patent

UNITED STATES PATENTS

| 826,507 | Holm | July 17, 1906 |
| 913,232 | Ponten | Feb. 23, 1909 |
| 1,863,213 | Wintroath | June 14, 1932 |

FOREIGN PATENTS

| 151,924 | Switzerland | Oct. 31, 1929 |